United States Patent
Chen

(10) Patent No.: US 8,406,238 B2
(45) Date of Patent: *Mar. 26, 2013

(54) PORTABLE ELECTRONIC DEVICE AND IMAGE DATA COMMUNICATION METHOD THEREOF

(75) Inventor: Ming-Yu Chen, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,679

(22) Filed: Apr. 3, 2012

(65) Prior Publication Data

US 2012/0194533 A1 Aug. 2, 2012

Related U.S. Application Data

(63) Continuation of application No. 12/566,903, filed on Sep. 25, 2009, now Pat. No. 8,284,781.

(51) Int. Cl.
*H04L 12/28* (2006.01)
*G06F 15/167* (2006.01)
*G06F 9/455* (2006.01)

(52) U.S. Cl. ............... 370/395.53; 709/216; 703/24

(58) Field of Classification Search ............ 709/248, 709/233, 203, 208, 216; 726/3, 159, 4; 370/329, 370/470, 472, 410, 412, 330, 328, 395.53, 370/395.1, 395.4, 252; 703/24

See application file for complete search history.

(56) References Cited

U.S. PATENT DOCUMENTS

| 7,373,656 B2* | 5/2008 | Lang et al. ............. 726/3 |
| 8,005,991 B2* | 8/2011 | Lo et al. .............. 709/248 |
| 2003/0017846 A1 | 1/2003 | Estevez et al. |
| 2003/0043110 A1 | 3/2003 | Chaves et al. |
| 2006/0099995 A1 | 5/2006 | Kim et al. |
| 2008/0147375 A1* | 6/2008 | Siren et al. ............. 703/24 |

FOREIGN PATENT DOCUMENTS

| CN | 1859669 | 11/2006 |
| CN | 101022500 | 8/2007 |
| CN | 1988614 A | 9/2012 |
| TW | 200901742 A | 1/2009 |
| WO | 2006052340 A2 | 5/2006 |
| WO | WO 2006/052340 | 5/2006 |
| WO | WO 2008153728 | 12/2008 |

OTHER PUBLICATIONS

Chinese language office action dated May 14, 2012.
English language translation of abstract of CN 1859669 (published Nov. 8, 2006).
English language translation of abstract of CN 101022500 (published Aug. 22, 2007).
TW Office Action dated Sep. 16, 2012.
CN Office Action dated Sep. 13, 2012.
English Abstract translation of TW200901742A (Published Jan. 1, 2009).
English Abstract translation of CN1988614A (Published Sep. 13, 2012).

* cited by examiner

*Primary Examiner* — Hanh N Nguyen
(74) *Attorney, Agent, or Firm* — McClure, Qualey & Rodack, LLP

(57) ABSTRACT

A portable electronic device and an image communication method thereof are provided. The portable electronic device includes a display, a processing module and a memory. The processing module provides frame data of a corresponding frame for the display to show, enables the portable electronic device to emulate a virtual storage device under a communication link, and produces image data compliant with a file format according to the frame data of the frame. The memory stores the image data, which can be read through the communication link. The processing module provides a frame data update for the display to show and updates the image data according to the frame data update.

18 Claims, 2 Drawing Sheets

PORTABLE ELECTRONIC DEVICE AND IMAGE DATA COMMUNICATION METHOD THEREOF

This application is a continuation application of application Ser. No. 12/566,903, filed on Sep. 25, 2009 (now U.S. Pat. No. 8,284,781), which claims the benefit of Taiwan application Serial No. 98113485, filed Apr. 23, 2009, the contents of which are incorporated herein by reference.

BACKGROUND OF THE INVENTION

1. Field of the Invention

The invention relates in general to a portable electronic device and an image communication method thereof, and more particularly to a portable electronic device capable of generating image data with ordinary file format from frame data and an image communication method thereof.

2. Description of the Related Art

With the rapid development in communication technology, portable electronic devices such as mobile phones and personal digital assistants have become indispensable electronic products for modern people in their daily life. The portable electronic device normally has a small-sized display. If the portable electronic device can be externally connected to a large-sized display, the user would find it more convenient to browse. However, the design of the portable electronic device is directed to slimness and compactness, therefore some portable electronic devices such as mobile phones, due to the restriction of the volume, do not provide the function of connecting to an external larger screen.

Some portable electronic devices having the function of outputting frame signal are limited to TV output (TV-OUT) mode and video graphics array output (VGA-OUT) mode. However, these portable electronic devices need to be installed with a corresponding interface circuit and an output plug, and the interface circuit and output plug occupy a certain hardware space of the portable electronic device. As the installation of extra interface circuit and output plug jeopardizes the slimness and compactness of the portable devices such as mobile phones or personal digital assistants, these modes of outputting frame signal are not adopted.

Apart from TV output, the data processing device such as desktop computer or notebook computer has a larger display, and can be easily availed. Currently, dedicated software, such as packet controller, supports the portable electronic device and transmits the frame data of the frame to the data processing device for the display of the data processing device to show the frame of the portable electronic device. The user has to install dedicated software on the portable electronic device and the to-be-linked data processing device to support the image data communication method, wherein the dedicated software must be compliant with both operating systems of the portable electronic device and the to-be-linked data processing device. Besides, whether the image data communication method is applicable depends on whether the manufacturers of the portable devices provide dedicated programs for various operating systems. If the dedicated software does not support the operating system of the to-be-linked data processing device, the image data communication method is inapplicable thereto. Thus, according to the conventional image data communication method, when the portable electronic device is used in different occasions, the above installation method seems complicated, time-consuming, and restrictive, and the convenience and applicability of the above installation method are largely restricted.

SUMMARY OF THE INVENTION

The invention is directed to a portable electronic device and an image communication method thereof. The portable electronic device according to an embodiment of the invention provides an image file containing the frame data, so that the data processing device can read and show the frame data of the portable electronic device through the display of the data processing device without having to install any dedicated software. Thus, the user can conveniently show the frame of the portable electronic device through other data processing devices.

According to a first aspect of the present invention, a portable electronic device including a display, a processing module and a memory is provided. The processing module provides frame data of a corresponding frame for the display to show, enables the portable electronic device to emulate a virtual storage device under a communication link, and produces image data compliant with a file format according to the frame data of the frame. The memory stores the image data, which can be read through the communication link. The processing module provides a frame data update for the display to show, and updates the image data according to the frame data update.

According to a second aspect of the present invention, an image communication method applicable to a portable electronic device is provided. The image communication method includes the following steps. Firstly, the portable electronic device is enabled to emulate a virtual storage device under a communication link. Next, frame data of a corresponding frame is provided for the portable electronic device to show and produce image data compliant with a file format accordingly. Then, the image data which can be read through the communication link is stored. After that, the frame data update is provided for the portable electronic device to show and update the image data accordingly.

The invention will become apparent from the following detailed description of the preferred but non-limiting embodiments. The following description is made with reference to the accompanying drawings.

DETAILED DESCRIPTION OF THE INVENTION

The portable electronic device of an embodiment of the invention includes a display, a processing module and a memory. The processing module provides frame data of a corresponding frame for the display to show, enables the portable electronic device to emulate a virtual storage device under a communication link, and produces image data compliant with a file format according to the frame data of the frame. The memory stores the image data, which can be read through the communication link. The processing module provides a frame data update for the display to show, and updates the image data according to the frame data update.

Figure 1:
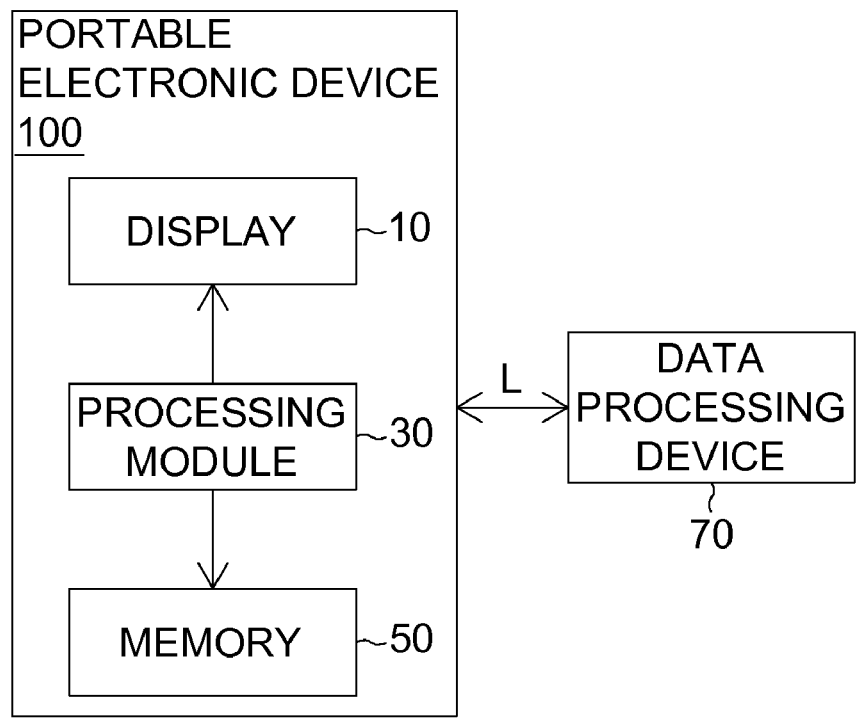
FIG. 1 shows a portable electronic device of an embodiment of the invention.

Referring to FIG. 1, a block diagram of a portable electronic device of an embodiment of the invention and a data processing device is shown. As indicated in FIG. 1, the portable electronic device 100 includes a display 10, a processing module 30 and a memory 50. The processing module 30 provides frame data corresponding to the frame of the portable electronic device 100. In the communication link L, the processing module 30 of the portable electronic device 100 enables the portable electronic device 100 to emulate a virtual storage device, and produces image data compliant with a file format according to the frame data of the frame shown by the display 10.

The data processing device 70 is a computer system such as an ordinary desktop or notebook computer. The portable electronic device 100 and the data processing device 70 are connected through a communication link by way of universal serial bus (USB), Bluetooth, infrared communication technology, wireless local network standard or wireless fidelity (WiFi) standard.

In an example, the portable electronic device 100 establishes a communication link with the data processing device 70 by way of USB transmission. Under the communication link L, the portable electronic device 100 is enabled to emulate a virtual storage device, such as USB mass storage device, through USB protocol to be read by the data processing device 70. In addition, the portable electronic device 100 establishes a communication link L with the data processing device 70 at another location through network by way of wireless link. In another example, the portable electronic device 100 is closer to the data processing device 70, and can establish a communication link with the data processing device 70 by way of Bluetooth or infrared technology.

The memory 50 stores the image data produced by the processing module 30, wherein the image data can be read by the portable electronic device 100 connected to the data processing device 70 through a communication link L. When the processing module 30 provides a frame data update for the display 10 to show, the processing module 30 updates the image data stored in the memory 50 according to the frame data update.

Figure 2:
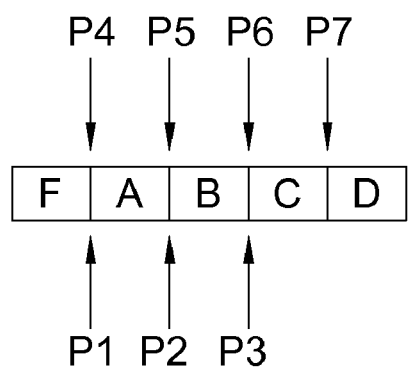
FIG. 2 shows a memory of FIG. 1 storing an image file.

Referring to both FIGS. 1 and 2, FIG. 2 shows a memory of FIG. 1 storing an image file. As indicated in FIG. 2, the file format of the image data is video file format for example. When the portable electronic device 100 responds to a read request of the data processing device 70 through the communication link L, the processing module 30 produces image data from the frame data of the frame and stores the image data in the memory 50. The processing module 30 also obtains an address P1 of the frame data stored in the memory block A of the memory 50, wherein the memory block A is read by the data processing device 70. The processing module 30 calculates an address P2 according to the address P1 of the memory block A, updates the frame data, and stores the frame data update in the memory block B of the memory 50 according to the address P2. The display 10 shows the next frame according to the frame data update.

When the portable electronic device 100 responds to the read request of the data processing device 70 again, the memory block B of the memory 50 is read by the data processing device 70, and the processing module 30 calculates an address P3 according to the address P2, sequentially updates frame data, and sequentially stores the frame data update in the memory block C of the memory 50 according to the address P3. The memory block F of the memory 50 is located at the header of the image file.

In the above embodiments of storing the image data in a memory, the structure of the video file of the embodiment of the invention can be implemented by various data structures such as linear data structure, cycling data structure or other data structures. The cycling data structure is to be exemplified below.

As indicated in FIG. 2, the processing module 30, being connected to the data processing device 70 through a communication link L, stores the frame data of the frame in the memory block A of the memory 50, and obtains an initial address P4. The processing module 30 updates the frame data and stores the frame data update in the memory block B according to an address P5. When the portable electronic device 100 responds to the read request of the data processing device 70, the memory block A of the memory 50 is read by the data processing device 70, the processing module 30 sequentially updates the frame data, and sequentially stores the frame data update in the memory block C according to an address P6. When the portable electronic device 100 again responds to the read request of the data processing device 70, the memory block B of the memory 50 is read by the data processing device 70, the processing module 30 sequentially updates the frame data, and sequentially stores the frame data update in the memory block D of the memory 50 according to an address P7. If the address P7 is the last address of the image file, the processing module 30 sequentially stores the next frame data update in the memory 50 from the initial address P4, so that the cycling data structure can effectively utilize the space of the memory 50. Thus, although the frame data update is sequentially stored, the memory is free of the problem of space shortage. However, if the image file is implemented by a linear data structure, then the memory will have the problem of decreased space in the memory due to the storage of continually increased frame data.

As indicated in FIG. 2, the file format of the image data is picture file format for example. The processing module 30 produces image data from the frame data of the frame, and stores the image data in the memory 50. The image data at least includes a first file. The processing module 30 sequentially updates the frame data of the frame, and sequentially and individually updates the image file according to the same data format of the first file. The updated image file at least includes a first file and a second file. Thus, the image data may include many files compliant with file format. The portable electronic device 100 further provides playlist information indicating the image data that can be played for the user to browse. However, the user may further determine whether to automatically or manually play the image data according to the setting of the playlist information.

The video file format or picture file format of the image file of the present embodiment of the invention is a format compliant with ordinary or commonly used standards such as the format which supports at least one of the formats including moving picture experts group (MPEG) standards (such as Motion-JPEG, MPEG-1, MPEG-2, MPEG-4), QuickTime multi-media format, audio-video interactive (AVI), joint photograph experts group (JPEG) standard, bit map picture (BMP), portable network picture (PNG) and graphics interchange format (GIF). Thus, without having to install any dedicated software, the data processing device enables the image file of the present embodiment of the invention to be playable by the software capable of supporting standard or commonly used multi-media format, such as the multi-media programs (such as Media Player, RealPlayer, Mplayer, QuickTime player) or the public or application programs of various operating systems (such as Microsoft Windows, UNIX, Linux, Mac OS) that support the play of multi-media data files, hence largely increasing convenience.

Besides, in other examples, the files of the abovementioned video files or image data can also be compressed according to their file formats so as to reduce the data volume. For example, the contents of the video file use the group of picture (GOP) as a basic unit and are compliant with MPEG-2 requirements.

Figure 3:
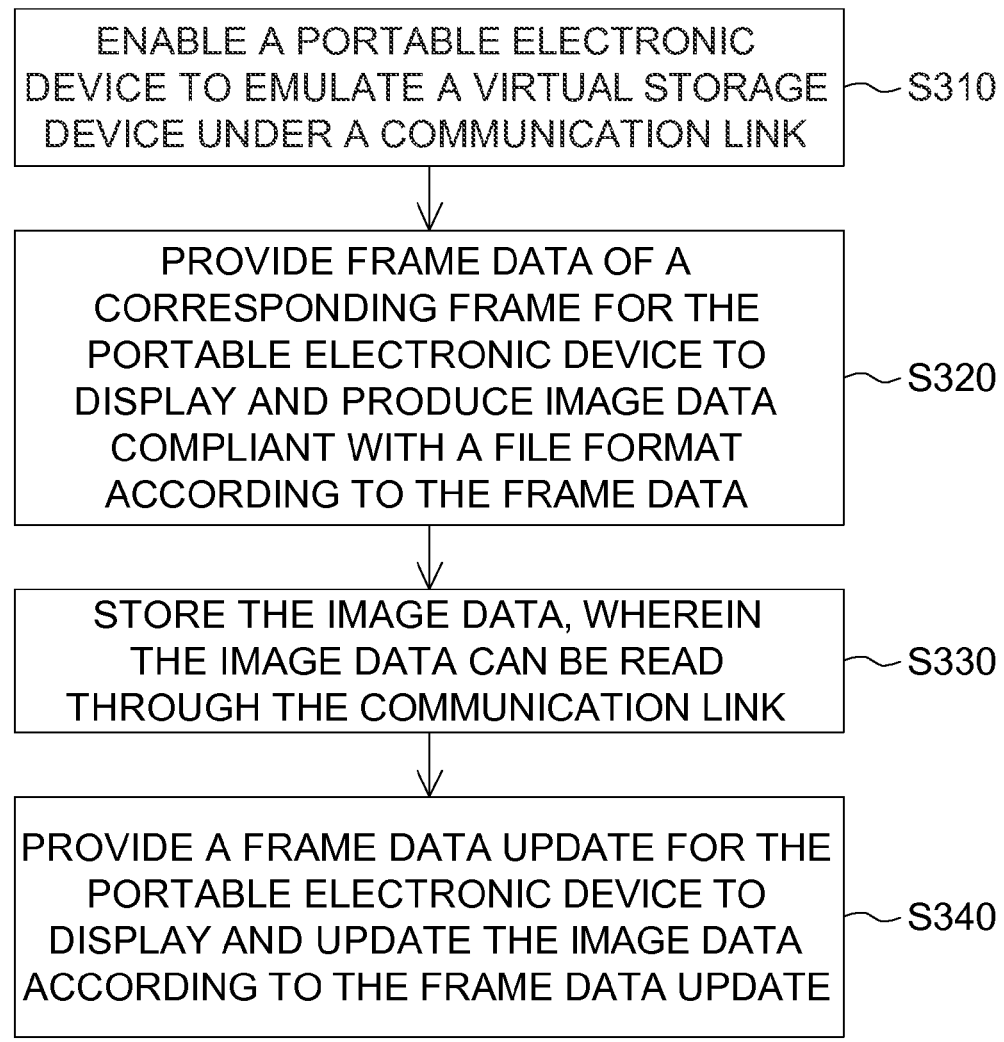
FIG. 3 shows a flowchart of an image communication method of an embodiment of the invention.

In addition, referring to FIGS. 1 and 3, FIG. 3 shows a flowchart of an image communication method of an embodiment of the invention. The image communication method can be used in the portable electronic device of FIG. 1. However, the application of the method is not limited to the embodiments using the portable electronic device of FIG. 1. As indicated in FIG. 3, the image communication method includes steps S310-S340. Firstly, the method begins at step S310, the portable electronic device 100 is enabled to emulate a virtual storage device under a communication link L.

Next, the method proceeds to step S320, frame data of a corresponding frame is provided for the portable electronic device 100 to show, and image data compliant with a file format is produced according to the frame data. Then, the method proceeds to step S330, the image file is stored and can be read through the communication link L. The image file is stored in the memory 50 of the portable electronic device 100. After that, the method proceeds to step S340, a frame data update is provided for the portable electronic device 100 to show, and the image data is updated according to the frame data update.

Besides, in other examples, the image communication method further includes the following steps. Whether a first read request is received is determined by the portable electronic device 100; if so, the image data is read, and the image data is updated according to the frame data update. Whether a second read request is received is determined; if so, the updated image data is read, and the image data is updated according to the frame data update.

The portable electronic device of the above embodiments of the invention and the method thereof has the following effects.

(1) The produced image file supports standard or commonly used file formats, and the data processing device can read the image file without having to install any dedicated software and can be used in different operating systems. The frame of the portable electronic device can be shown on the display of the data processing device, hence largely increasing convenience.

(2) Besides, the portable electronic device can provide image file by way of a communication link through, for example, network, USB, Bluetooth or infrared, and can crossover different communication methods, platforms or networks. Compared with the conventional method which requires a dedicated program, the embodiment of the invention has higher applicability and popularity. Thus, the user can more flexibly use other data processing devices to show the frame of the portable electronic device.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic device, comprising:
   a display;
   a processing module for providing frame data of a corresponding frame for the display to show, for enabling the portable electronic device to emulate a virtual storage device under a communication link, and for producing image data compliant with a file format according to the frame data of the frame; and
   a memory for storing the image data, wherein the image data is readable through the communication link;
   wherein the processing module provides a frame data update for the display to show, and updates the image data according to the frame data update.

2. The portable electronic device according to claim 1, wherein the display shows a next frame according to the frame data update.

3. The portable electronic device according to claim 1, wherein the file format is a video file format, and the image data produced by the processing module is a video file compliant with the video file format.

4. The portable electronic device according to claim 3, wherein the portable electronic device outputs data from the video file in response to a read request under the communication link, and the processing module obtains a storage location according to the read request and updates the video file at the storage location.

5. The portable electronic device according to claim 1, wherein the file format is a picture file format, and the image data produced by the processing module according to the image data of the frame comprises at least a first file.

6. The portable electronic device according to claim 5, wherein the updated image data produced by the processing module comprises at least the first file and a second file compliant with the file format.

7. The portable electronic device according to claim 1, wherein the file format supports at least one of the following formats: moving picture experts group standard, audio-video interactive, joint photograph experts group standard, bit map picture, portable network picture and graphics interchange format.

8. The portable electronic device according to claim 1, wherein the communication link is established through at least one of USB, Bluetooth, infrared communication technology, wireless network standard and WiFi standard.

9. An image communication method applicable to a portable electronic device, the data communication method comprising:
   enabling the portable electronic device to emulate a virtual storage device under a communication link;
   providing frame data of a corresponding frame for the portable electronic device to show and producing image data compliant with a file format according to the frame data;
   storing the image data, wherein the image data can be read through the communication link; and
   providing a frame data update for the portable electronic device to show and updating the image data according to the frame data update.

10. The method according to claim 9, wherein the portable electronic device shows a next frame according to the frame data update.

11. The method according to claim 9, wherein the file format is a video file format, the image data is a video file compliant with the video file format.

12. The method according to claim 11, wherein the method further comprises:
   in response to a read request under the communication link, outputting data from the video file;
   obtaining a storage location according to the read request and updating the video file at the storage location.

13. The method according to claim 9, wherein the file format is a picture file format, and the image data produced according to the frame data of the frame comprises at least a first file.

14. The method according to claim 13, wherein the updated image data comprises:
at least the first file and a second file compliant with the file format.

15. The method according to claim 13, wherein the method further comprises:
providing playlist information indicating file information of the image data to be played.

16. The method according to claim 9, wherein the file format supports at least one of moving picture experts group standard, audio-video interactive, joint photograph experts group standard, bit map picture, portable network picture, and graphics interchange format.

17. The method according to claim 9, wherein the communication link is established through at least one of USB, Bluetooth, infrared communication technology, wireless network standard and WiFi standard.

18. The portable electronic device according to claim 1, wherein the portable electronic device responds to a read request when the portable electronic device emulates the virtual storage device under the communication link.

* * * * *